Patented June 6, 1933

1,912,849

UNITED STATES PATENT OFFICE

GEORG KRÄNZLEIN AND PAUL OCHWAT, OF FRANKFORT-ON-THE-MAIN-HOCHST, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

HETEROCYCLIC BASES OF THE AMINOIMIDAZOLINE SERIES AND PROCESS OF PREPARING THEM

No Drawing. Application filed April 8, 1929, Serial No. 353,662, and in Germany April 27, 1928.

The present invention relates to heterocyclic bases of the aminoimidazoline series of the following general formula:

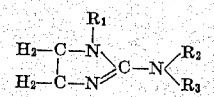

wherein $R_1$ stands for H or alkyl, $R_2$ for H, alkyl or aryl and $R_3$ for alkyl or aryl and process of preparing them.

We have found that the bases of the aminoimidazoline series are easily obtained with a good yield by causing the ethers of ethylene thioureas to react with amines with or without using a diluent, and at a temperature of between 100° C. and 200° C. The bases thus obtained are readily soluble in organic solvents with the exception of ether. They dissolve in water with a strongly alkaline reaction. The said bases are intended to be used as intermediate products for the preparation of dyestuffs and auxiliary means in dyeing. These compounds constitute moreover extremely valuable accelerators which even with a low content of sulfur yield vulcanized products whose tensile strength is by 20–25 per cent higher than usual.

The products of the afore-mentioned class which as we have found constitute new vulcanizers, show an extremely high efficiency as accelerators which are as such in many cases superior for instance to diarylguanidine. For example tolylaminoimidazoline is an accelerator which acts within wide limits of temperature and yields vulcanized products of a high tensile strength and great elasticity. With normal vulcanization temperatures, under 3 to 4 atmospheres pressure, the vulcanization of the mixtures prepared with the said accelerator, can be effected in a very short time. A special advantage of this product is that the vulcanized products prepared therewith are nearly odorless. By vulcanizing for instance 100 parts of rubber, 3½ parts of sulfur, 5 parts of zinc oxide, 1 part of para-tolylaminoimidazoline under 3½ atmospheres pressure the tensile strength is much superior to that of a rubber prepared with diphenylguanidine.

The following examples serve to illustrate the invention, but they are not intended to limit it thereto, the parts being by weight:

(1) 50 parts of ethylene thiourea iodomethylate (prepared from ethylene thiourea and methyl iodide and which recrystallized from alcohol has a melting point of 137° C.) and 44 parts of para-toluidine are boiled in 250 parts of amylalcohol until the development of mercaptan is complete; the mass is then distilled with water-vapor in order to remove the amylalcohol and the unchanged toluidine. The remaining aqueous solution of tolylamino-imidazoline is filtered and the filtrate is rendered strongly alkaline by means of caustic soda solution. The imidazoline which has separated is filtered with suction and washed with cold water. This product can be freed from any still adhering toluidine by washing it with ether. It crystallizes from water in long needles having a melting point of 133° C.–134° C. The reaction may be illustrated by the following formulæ:

(a) 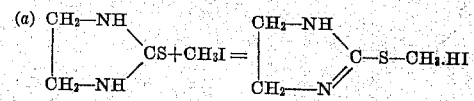

(b) 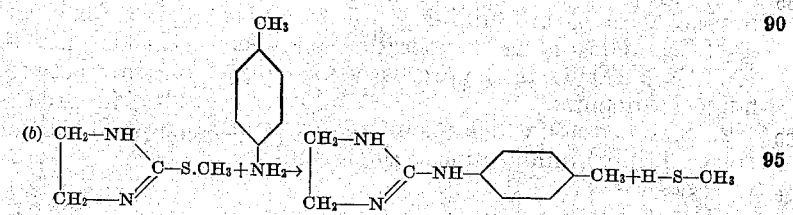

The corresponding phenylamine (forming when recrystallized from water white laminæ) melts at 122° C. The N-(phenylmethyl)-aminoimidazoline prepared by means of monomethylaniline melts at 131° C. The compounds form difficultly soluble picrates.

(2) 108 parts of ethylene thiourea are mixed, while stirring with 125 parts of dimethylsulfate in 250 parts of alcohol, while cooling, until the whole is dissolved; the alcohol is then removed by evaporation and the residue is heated together with 500 parts of para-toluidine to 130° C. and stirred until the evolution of mercaptane is complete. The product is worked up as indicated in Example 1. The reaction may be illustrated by the following formulæ:

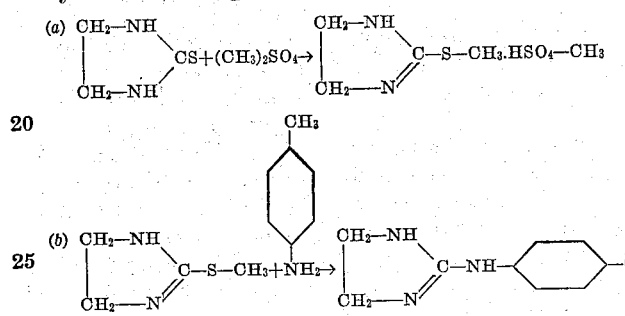

In an analogous manner ethylene thiourea can be caused to react with other amines, such as for instance cyclohexylaniline, naphthylamine or the like. The new compounds are valuable intermediate products for use in pharmaceutical and dyestuff chemistry and auxiliary means for dyeing purposes.

(3) If there is used cyclohexylamine instead of the paratoluidine mentioned in Example 1 and the process is otherwise carried out as indicated in Example 1, cyclohexylamino-imidazoline is obtained having its melting point at 102° C. (when crystallized from chlorobenzene). The reaction may be illustrated by the following formulæ:

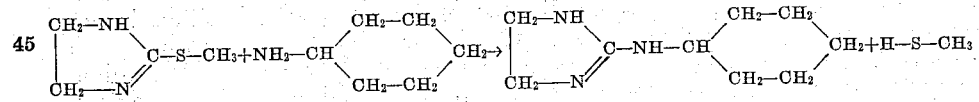

We claim:

1. The process which comprises causing (methyl.thio-) imidazoline of the formula:

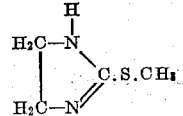

to react with para-toluidine of the formula: $H_2N.C_6H_4.CH_3$ at a temperature between 100° C. to 200° C. in the presence of an alcohol as a diluent.

2. The process which comprises causing (methyl.thio-) imidazoline of the formula:

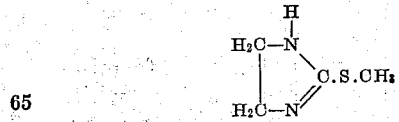

to react with cyclohexylamine of the formula: $NH_2.C_6H_{11}$ at a temperature between 100° C. to 200° C. in the presence of an alcohol as a diluent.

3. As a new product the compound of the formula:

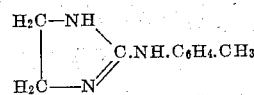

forming a white crystalline body of the melting point of 133° C. to 134° C.

4. As a new product the compound of the formula:

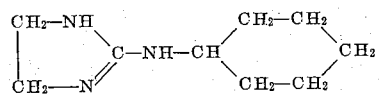

of the melting point of 102° C. when crystallized from chlorobenzene.

5. The process which comprises causing a compound of the formula:

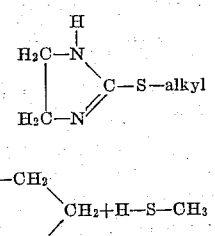

to react with an amine of the formula:

wherein $R_1$ stands for hydrogen or alkyl, $R_2$ stands for a carbocyclic aromatic radical or a carbocyclic hydroaromatic radical at a temperature between 100° C. to 200° C.

6. The process which comprises causing a compound of the formula:

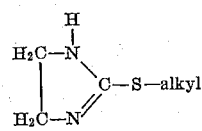

to react with an amine of the formula:

wherein $R_1$ stands for hydrogen or alkyl, $R_2$ stands for a carbocyclic aromatic radical or a carbocyclic hydroaromatic radical at a temperature between 100° C. to 200° C. the amine being employed in excess.

7. The process which comprises causing a compound of the formula:

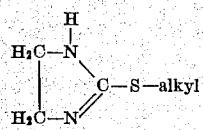

to react with an amine of the formula:

wherein $R_1$ stands for hydrogen or alkyl, $R_2$ stands for a carbocyclic aromatic radical or a carbocyclic hydroaromatic radical at a temperature between 100° C. to 200° C. in the presence of an inert diluent.

8. The process which comprises causing a compound of the formula:

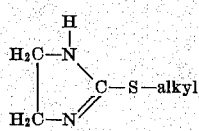

to react with an amine of the formula:

wherein $R_1$ stands for hydrogen or alkyl, $R_2$ stands for a carbocyclic aromatic radical or a carbocyclic hydroaromatic radical at a temperature between 100° C. to 200° C. in the presence of an alcohol as a diluent.

9. The process which comprises causing a compound of the formula:

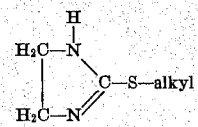

to react with an amine of the formula:

wherein $R_1$ stands for hydrogen or alkyl, $R_2$ stands for a carbocyclic aromatic radical or a carbocyclic hydroaromatic radical at a temperature between 100° C. to 200° C. in the presence of amylalcohol as a diluent.

10. The process which comprises causing (methyl. thio-) imidazoline of the formula:

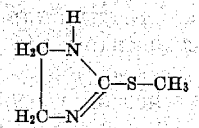

to react with an amine of the formula:

wherein $R_1$ stands for hydrogen or alkyl, $R_2$ stands for a carbocyclic aromatic radical or a carbocyclic hydroaromatic radical at a temperature between 100° C. to 200° C. in the presence of an alcohol as a diluent.

11. The process which comprises causing (methyl. thio-) imidazoline of the formula:

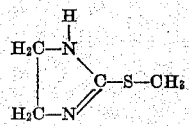

to react with an amine of the formula: $H_2N.R_2$ wherein $R_2$ stands for a carbocyclic aromatic radical or a carbocyclic hydroaromatic radical at a temperature between 100° C. to 200° C. in the presence of an alcohol as a diluent.

12. The process which comprises causing (methyl-thio-) imidazoline of the formula:

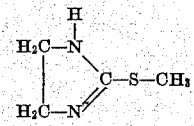

to react with an amine of the formula: $H_2N.R_2$ wherein $R_2$ stands for a carbocylic aromatic radical at a temperature between 100° C. to 200° C. in the presence of an alcohol as a diluent.

13. The compounds of the general formula:

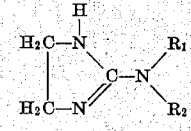

wherein $R_1$ stands for hydrogen or alkyl, $R_2$ stands for a carbocyclic aromatic radical or a carbocyclic hydroaromatic radical, said compounds being white crystalline products, readily dissolving in water with an alkaline reaction and having the property of accelerating the vulcanization of caoutchouc.

14. The compounds of the general formula:

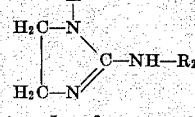

wherein $R_2$ stands for a carbocyclic aromatic radical or a carbocyclic hydroaromatic radical, said compounds being white crystalline products, readily dissolving in water with an alkaline reaction and having the property of accelerating the vulcanization of caoutchouc.

In testimony whereof, we affix our signatures.

GEORG KRÄNZLEIN.
PAUL OCHWAT.